United States Patent
Demange et al.

(10) Patent No.: US 9,678,525 B2
(45) Date of Patent: Jun. 13, 2017

(54) METHOD FOR SMOOTHING A CURRENT CONSUMED BY AN INTEGRATED CIRCUIT AND CORRESPONDING DEVICE

(71) Applicant: STMICROELECTRONICS (ROUSSET) SAS, Rousset (FR)

(72) Inventors: Nicolas Demange, Saint-Maximin (FR); Jimmy Fort, Puyloubier (FR); Thierry Soude, Puyloubier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/150,713

(22) Filed: May 10, 2016

(65) Prior Publication Data

US 2017/0097653 A1    Apr. 6, 2017

(30) Foreign Application Priority Data

Oct. 1, 2015   (FR) .................................. 15 59354

(51) Int. Cl.
  *G05F 3/26*    (2006.01)
  *H01L 23/00*   (2006.01)
  *H03B 29/00*   (2006.01)

(52) U.S. Cl.
  CPC ............ *G05F 3/262* (2013.01); *H01L 23/576* (2013.01); *H03B 29/00* (2013.01)

(58) Field of Classification Search
  CPC .................................................... H01L 23/576
  See application file for complete search history.

(56) References Cited

U.S. PATENT DOCUMENTS

| | | | |
|---|---|---|---|
| 4,932,053 A | 6/1990 | Fruhauf et al. | |
| 6,107,868 A * | 8/2000 | Diniz | G05F 3/245 327/512 |
| 7,227,401 B2 * | 6/2007 | Zhang | G05F 3/247 327/513 |
| 7,372,965 B1 | 5/2008 | Wuidart | |
| 2005/0027471 A1 | 2/2005 | Vergnes | |
| 2006/0156039 A1 | 7/2006 | Deveaud et al. | |
| 2015/0001938 A1 | 1/2015 | Fort | |

FOREIGN PATENT DOCUMENTS

| | | |
|---|---|---|
| EP | 0368727 | 5/1990 |
| FR | 2793904 | 11/2000 |
| FR | 2857804 | 1/2005 |
| FR | 3007857 | 1/2015 |
| WO | 9966452 | 12/1999 |
| WO | 2004027688 | 4/2004 |

OTHER PUBLICATIONS

Mesquita et al., "Current Mask Generation: A Transistor Level Security Against DPA Attacks", Sep. 2005, pp. 115-120.
Vahedi et al., "On-chip current flattening circuit with dynamic voltage scaling", School of Engineering, University of Guelph, Guelph, Canada, IEEE International Symposium on Circuits and Systems, 2006, pp. 4277-4280.

* cited by examiner

*Primary Examiner* — Jeffrey Zweizig
(74) *Attorney, Agent, or Firm* — Slater Matsil, LLP

(57) ABSTRACT

A method for smoothing current consumed by an electronic device is based on a series of current copying operations and on a current source delivering a reference current. The reference current is delivered in such a manner that current consumed as seen from the power supply depends on the reference current.

26 Claims, 6 Drawing Sheets

METHOD FOR SMOOTHING A CURRENT CONSUMED BY AN INTEGRATED CIRCUIT AND CORRESPONDING DEVICE

FIELD OF THE INVENTION

Various embodiments and their implementation relate to integrated circuits, and more particularly, to integrated circuits with secure modules, and notably the protection of these modules against external attacks of the SPA (Simple Power Analysis) type.

BACKGROUND

An integrated circuit comprising a module can be the target of attacks aimed at recovering secure information. In particular, the attacks may be by analysis of power consumption or SPA.

In operation, an integrated circuit consumes more or less power depending on the operations that it is carrying out. SPA attack comprises the analysis of these variations in power consumption to determine the operations being carried out and/or their occurrences.

In secured applications, it is therefore recommended to smooth the power consumption seen from the power supply. This is done in such a manner to make it more difficult for a potential attacker to determine the activity of the various components of the circuit by SPA attacks.

There is circuitry to protect against SPA attacks, such as shunt regulators, for example. However, circuitry with shunt regulators is not suitable for smoothing the current consumed by several modules.

SUMMARY

According to one embodiment, a different and straightforward approach is provided for smoothing current seen from the power supply of an integrated circuit. This approach is compatible with an integrated circuit comprising several secure modules.

A method for smoothing current consumed by a power supply for an electronic circuit is provided. The electronic circuit may comprise at least one module, such as a microprocessor, memory, etc., powered directly or indirectly by the power supply, via a voltage regulator. The at least one module consumes a module current.

For each module, a module auxiliary current equal to a first fraction of the corresponding module current may be generated within the electronic circuit. The electronic circuit may be equipped with a first stage, powered by the power supply, comprising at least one main current source supplying a main current higher than the sum of the maximum values of each module auxiliary current. The first stage may deliver a stage current at least equal to the main current. An intermediate current equal to a difference between the stage current and a secondary current equal to the sum of each module auxiliary current may be generated. In a terminal stage powered by the power supply, the intermediate current may be multiplied by a multiplication factor equal to an inverse of the first fraction augmented by one.

Thus, in the above method, a plurality of currents consumed by the power supply may be generated, whose sum does not depend on the current consumed by each module but instead on the current supplied by the current source stage. The power consumption of the integrated circuit may therefore be smoothed. This overall smoothed power consumption as externally viewed may be higher than the sum of the maximum power consumptions of each module.

The main current delivered by the main current source may be a second fraction of a reference current. This second fraction may be equal to the first fraction, and of course in this case, the reference current may be higher than the sum of the maximum values of each module auxiliary current.

The first stage may further comprise at least one additional activatable current source delivering an additional current. The stage current may be equal to the sum of the main current and of each additional current delivered by each activated additional current source.

Thus, by activating successively and/or simultaneously the various current sources, the current consumed by the power supply varies. This may render the detection of the variations of the module current even more difficult. In this regard, it is also possible to add capacitive noise within the device, for example, at the output of the first stage.

According to another aspect, an electronic device comprises a power supply terminal, and at least one module connected to the power supply terminal and configured for consuming a module current. First generation means or circuitry may be connected to the power supply terminal and may be configured for generating, for each module, a module auxiliary current equal to a first fraction of the corresponding module current. A first stage, connected to the power supply terminal, may comprise at least a main current source configured for supplying a main current higher than the sum of the maximum values of each module auxiliary current. The first stage may be configured for delivering a stage current at least equal to the main current. Second generation means or circuitry may be configured for generating an intermediate current equal to the difference between the stage current and a secondary current equal to the sum of each module auxiliary current. A terminal stage may be connected to the power supply terminal and may be configured for multiplying the intermediate current by a multiplication factor equal to the inverse of the first fraction incremented by one.

The main current may be equal to a second fraction of a reference current. The main current source may comprise a control input designed to receive a control signal allowing the value of the second fraction to be selected from a set of values. The first fraction may be equal to the second fraction, and in this case, the reference current may be higher than the sum of the module auxiliary currents.

The device advantageously comprises a succession of current copying means or circuitry. Thus, the first generation circuitry may comprise, for each module, a first copy factor current mirror equal to the first fraction. The first copy factor current mirror has a first output delivering the corresponding module current, and a second output delivering the corresponding module auxiliary current.

The second generation circuitry may comprise a second copy factor current mirror equal to one. The second output of the first current mirror may be connected to the input of the second current mirror. The output of the second current mirror may be connected to the output of the first current source stage.

The terminal stage may comprise current copying means or circuitry having a copy factor equal to the multiplication factor. The current copying circuitry may have an input connected to the output of the second generation circuitry, and an output connected to the power supply terminal.

According to one embodiment, the terminal stage may comprise a first MOS transistor connected to the output of the second current mirror, and at least a second MOS transistor connected between the power supply terminal and ground. The gates of the MOS transistors may be connected together.

In addition, to ensure better current copying by the second generation circuitry, notably when the module auxiliary current or the sum of the module auxiliary currents is close to the stage current, an intermediate operational amplifier may also be added. The intermediate operational amplifier may have a non-inverting input connected to the output of the second current mirror, an inverting input connected to the input of the second current mirror, and an output connected to the gates of the MOS transistors of the terminal stage.

Also, to improve the current copying, the first generation circuitry may comprise, for each module, a first cascode stage connected between the second output of the corresponding first current mirror and the input of the second current mirror. The first cascode stage may comprise a first PMOS transistor and a first operational amplifier. The first operational amplifier may have a non-inverting input connected between the power supply terminal and the corresponding module, an inverting input connected to the source of the first PMOS transistor, and an output connected to the gate of the first PMOS transistor.

A second cascode stage may also be connected between the output of the terminal stage and the power supply terminal. The cascode stage may comprise a second PMOS transistor and a second operational amplifier. The second operational amplifier may have a non-inverting input connected between the output of the terminal stage and the second PMOS transistor, an inverting input connected to the input of the terminal stage, and an output connected to the gate of the second PMOS transistor.

The first stage may comprise at least one additional current source activatable independently of the main current source. The outputs of all the current sources may be connected to the output of the first stage.

The electronic device may further comprise a generator of capacitive noise, for example. The capacitive noise generator may be connected to the output of the first stage.

A regulator configured for delivering a regulated voltage to the at least one module may be connected between the power supply terminal and the at least one module. The regulator may comprise the first generation circuitry.

According to one embodiment, the device may comprise a plurality of modules, and the first generation circuitry may comprise a plurality of first outputs respectively connected to the modules to deliver the respective module currents and a plurality of second outputs connected together to the input of the first generation circuitry to deliver the secondary current.

BRIEF DESCRIPTION OF THE DRAWINGS

Other advantages and features will become apparent upon examining the detailed description of one non-limiting embodiment and its implementation, and from the appended drawings in which.

DETAILED DESCRIPTION

Figure 1:
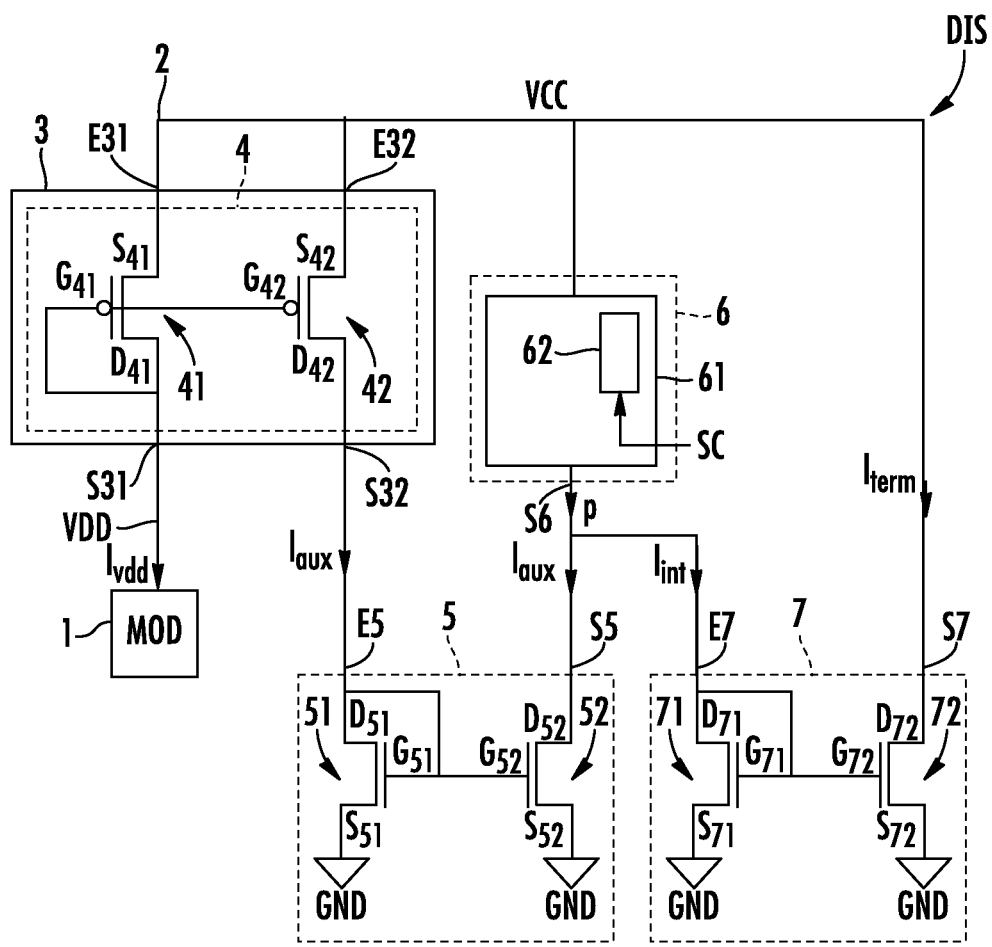
FIGS. 1 to 6 show schematically block diagrams of various embodiments according to the present disclosure.

In the following description, the terms coupled and connected denote an electrical link which is either direct or indirect via other devices or means of connection. In FIG. 1, the reference DIS denotes an electronic device according to one embodiment.

The device DIS comprises a module 1, for example, a microprocessor of a smartcard. The device may be situated within the integrated circuit of the smartcard.

The device DIS furthermore comprises a power supply terminal 2 designed to receive a power supply voltage $V_{cc}$, for example, a voltage of 5 Volts. The device DIS also comprises first generation circuitry 4 comprising a first input E31 and a second input E32 connected to the power supply terminal 2. The first generation circuitry 4 also comprises a first output S31 and a second output S32.

The device comprises second generation circuitry 5 comprising an input E5 and an output S5. The device comprises a terminal stage 7 comprising an input E7 and an output S7. The device comprises a first current source stage 6 comprising an input E6 and an output S6. Their respective connections and characteristics will be described in more detail below.

A regulator 3 is connected between the power supply terminal 2 and the microprocessor 1. The connection is in such a manner so as to deliver a regulated voltage $V_{dd}$ to the microprocessor. For example, a voltage of 2.5 Volts may be delivered. The microprocessor 1 consumes a current $I_{vdd}$ whose value depends on the operations that it carries out.

In this example, the regulator 3 comprises the first generation circuitry 4. The first generation circuitry 4 comprises a first current mirror which delivers, at the input E5 of the second generation circuitry 5, an auxiliary current $I_{aux}$ equal to a first fraction of the current consumed $I_{vdd}$. In this example, the current mirror has a copy factor equal to $1/100$. In other words, the current mirror delivers a module auxiliary current $I_{aux}$ equal to one hundredth of the current consumed $I_{vdd}$ (the first fraction is equal to $1/100$).

The first current mirror conventionally comprises two transistors 41 and 42 coupled together via their gates. The first transistor 41, for example a PMOS transistor, is configured as a diode. The first transistor 41 has a source $S_{41}$, which forms the first input E31 of the first generation circuitry, connected to the first power supply terminal, and a drain $D_{41}$, which forms the first output S31 of the first generation circuitry, connected to the module 1.

The second transistor 42, for example a second PMOS transistor, has a source $S_{42}$, which forms the second input E32 of the first generation circuitry 4, connected to the power supply terminal 2, and a drain $D_{42}$, which forms the second output S32 of the first generation circuitry, connected to the input E5 of the second generation circuitry 5.

To obtain the first fraction of the consumed current $I_{vdd}$, the second PMOS transistor may be chosen having a ratio $W_{42}/L_{42}$ between the width $W_{42}$ and the length $L_{42}$ of its channel 100 times smaller than the ratio $W_{41}/L_{41}$ between the width $W_{41}$ and the length $L_{41}$ of the channel of the first transistor 41.

An alternative approach would be to have a plurality of first transistors 41 connected in parallel and one or more second transistors 42 identical to the first transistors 41 connected in parallel. The connection is in such a manner that the number of first transistors is 100 times greater than the number of second transistors.

In this example, the second generation circuitry 5 comprises a second current mirror, with a copy factor equal to one. The second current mirror conventionally comprises two identical transistors 51 and 52, for example NMOS transistors, coupled together by their gates $G_{51}$ and $G_{52}$.

The first NMOS transistor 51 is configured as a diode. The first NMOS transistor 51 has a drain $D_{51}$, which forms the input E5 of the second generation circuitry 5, connected to the drain $D_{42}$ of the second PMOS transistor 42 of the first current mirror, and a source $S_{51}$ connected to ground GND.

The second NMOS transistor 52 has a source $S_{52}$ connected to ground, and a drain $D_{52}$, which forms the output S5 of the second generation circuitry 5, connected to the input E7 of the terminal stage 7 and to the output S6 of the first stage 6. Thus, the second generation circuitry receives the module auxiliary current $I_{aux}$ at the input E5 and copies this same module auxiliary current $I_{aux}$ at the output S5.

The first stage 6 comprises a main current source 61 connected between the power supply terminal 2 and the input E7 of the terminal stage. The main current source 61 is configured for delivering a main current $I_p$, equal to a second fraction of a reference current $I_{set}$, to the input E7 of the terminal stage 5.

The first fraction is chosen equal to the second fraction. Thus, in this example where the module auxiliary current $I_{aux}$ is equal to $$\frac{Ivdd}{100},$$

the main current $I_p$ is equal to $$\frac{Iset}{100}.$$

The reference current $I_{set}$ is chosen to be higher than the maximum value of the module current $I_{vdd}$.

The maximum value of the module current $I_{vdd}$ is, for example, determined by simulation during the design of the integrated circuit taking into account the foreseeable activity of the module 1. Since the reference current $I_{set}$ is higher than the maximum value of the maximum module current, the main current $I_p$ is higher than the maximum value of the module auxiliary current $I_{aux}$.

The main current source 61 may further comprise a control input 62 designed to receive a control signal SC allowing the second fraction to be chosen from among a predefined set of values. For example, the set of values can be $$\left\{\frac{1}{100}; \frac{1}{60}; \frac{1}{50}; \frac{1}{40}\right\},$$

and the main current $I_p$ delivered can therefore be equal to $$\frac{Iset}{100}, \text{ or } \frac{Iset}{60},$$

etc.

Since the first stage 6 delivers a main current $I_p$ equal to $$\frac{Iset}{100},$$

the terminal stage 7 therefore receives a positive intermediate current $I_{int}$ equal to $$\frac{Iset}{100} - \frac{Ivdd}{100}$$

at its input E7. The terminal stage 7 comprises, in this example, a third copy factor current mirror equal to the inverse of the first fraction incremented by 1. The third current mirror therefore has a copy factor equal to 101.

The third current mirror conventionally comprises a third and a fourth transistor 71 and 72, for example NMOS transistors, coupled together via their gates $G_{71}$ and $G_{72}$.

The third NMOS transistor 71 is configured as a diode. The third NMOS transistor 71 has a source $S_{71}$ connected to ground, and a drain $D_{71}$, which forms the input E7 of the terminal stage, connected to the output S5 of the second generation circuitry and to the output S6 of the first stage. The fourth NMOS transistor 72 has a source $S_{72}$ connected to ground GND and a drain $D_{72}$ connected to the power supply terminal 2.

To obtain a multiplication factor equal to 101, a fourth NMOS transistor 72 can be chosen whose ratio $W_{72}/L_{72}$ between the width $W_{72}$ and the length $L_{72}$ of its channel is 101 times greater than the ratio $W_{71}/L_{71}$ between the width $W_{71}$ and the length $L_{71}$ of the channel of the third transistor 71.

An alternative approach would be to have one or more third transistors 71 connected in parallel and a plurality of fourth transistors 72, identical to the third transistors 71, connected in parallel in such a manner that the number of fourth transistors is 101 times higher than the number of third transistors.

Thus, the terminal stage generates a current $I_{term}$ equal to 101 times the intermediate current $I_{int}$. The current $$I_{term} = 101 * \frac{Iset - Ivdd}{100}.$$

In operation, the device DIS thus configured therefore consumes the first current $I_{vdd}$, the module auxiliary current $$I_{aux} = \frac{Ivdd}{100},$$

the main current $$I_p = \frac{Iset}{100},$$

and the terminal current $$I_{term} = 101 * (I_p - I_{aux}).$$

The current $I_{vcc}$ consumed by the power supply is therefore equal to the sum of these currents, i.e., $1.02*I_{set}$, and does not depend on the module current $I_{vdd}$ but only on the reference current $I_{set}$. The reference current $I_{set}$ is constant and higher than the maximum value of the module current $I_{vdd}$.

Figure 2:
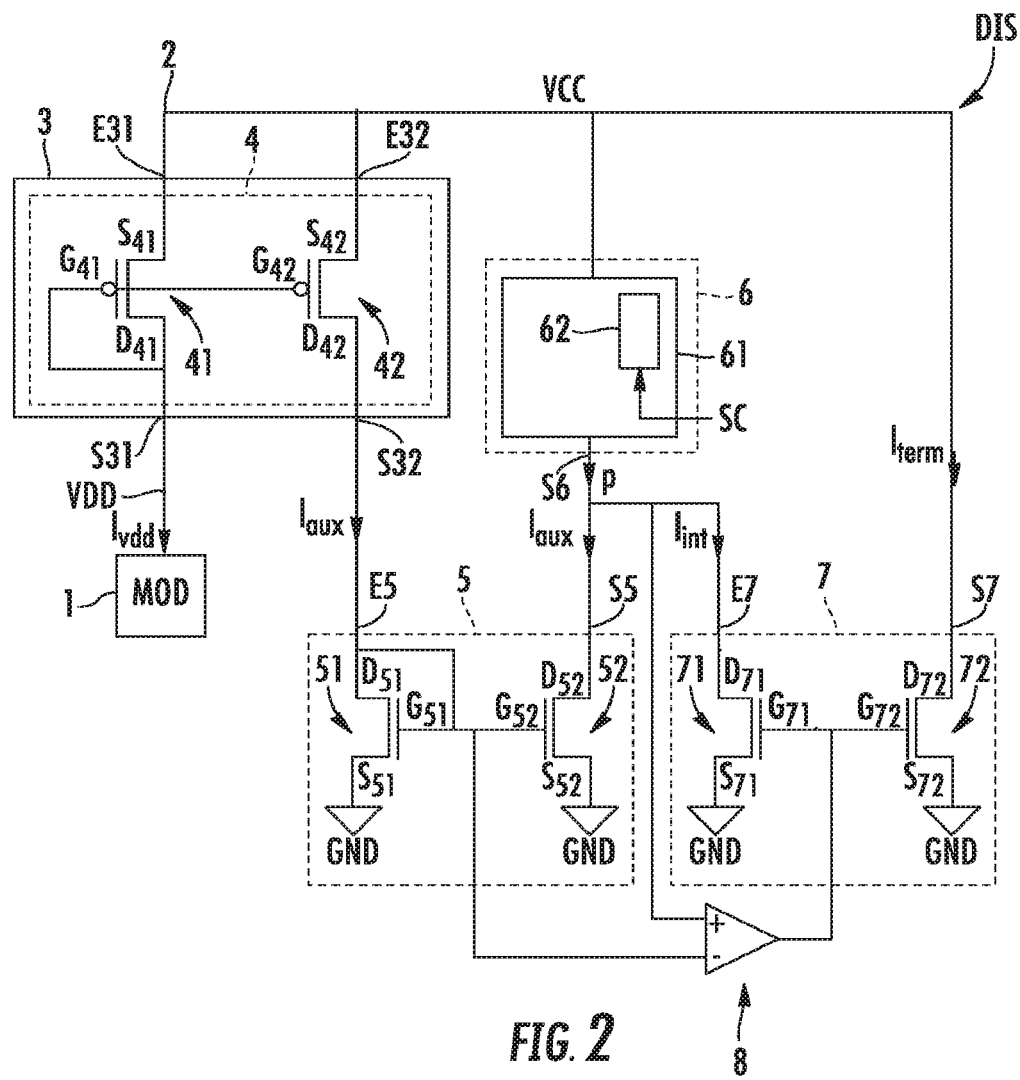

FIG. 2 illustrates a second embodiment. In this embodiment, the device DIS as previously described has been modified in such a manner that the third NMOS transistor 71 of the terminal stage is no longer configured as a diode. An operational amplifier 8 has been added between the second generation circuitry 5 and the terminal stage 7.

The operational amplifier 8 has a non-inverting input connected to the input E7 of the terminal stage, and an inverting input connected to the mutually-coupled $G_{51}$ and $G_{52}$ gates of the first and second NMOS transistors 51 and 52. In other words, connection is to the first input E5 of the second generation circuitry 5 since the first NMOS transistor 51 is configured as a diode. The output of the amplifier 8 is connected to the mutually-coupled gates $G_{71}$ and $G_{72}$ of the third NMOS transistor 71 and of the fourth NMOS transistor 72.

Thus, by driving the gate $G_{71}$ of the third NMOS transistor 71 in such a manner as to equalize the potentials of the drains $D_{51}$ and $D_{52}$ of the first and second NMOS transistors 51 and 52, the operational amplifier allows an intermediate current $I_{int}$ to be obtained. The intermediate current $I_{int}$ is obtained at the input E7 of the terminal stage which is precisely equal to the difference between the main current $I_p$ and the module auxiliary current $I_{aux}$. This is true even if the module auxiliary current $I_{aux}$ has a value close to the main current $I_p$.

Figure 3:
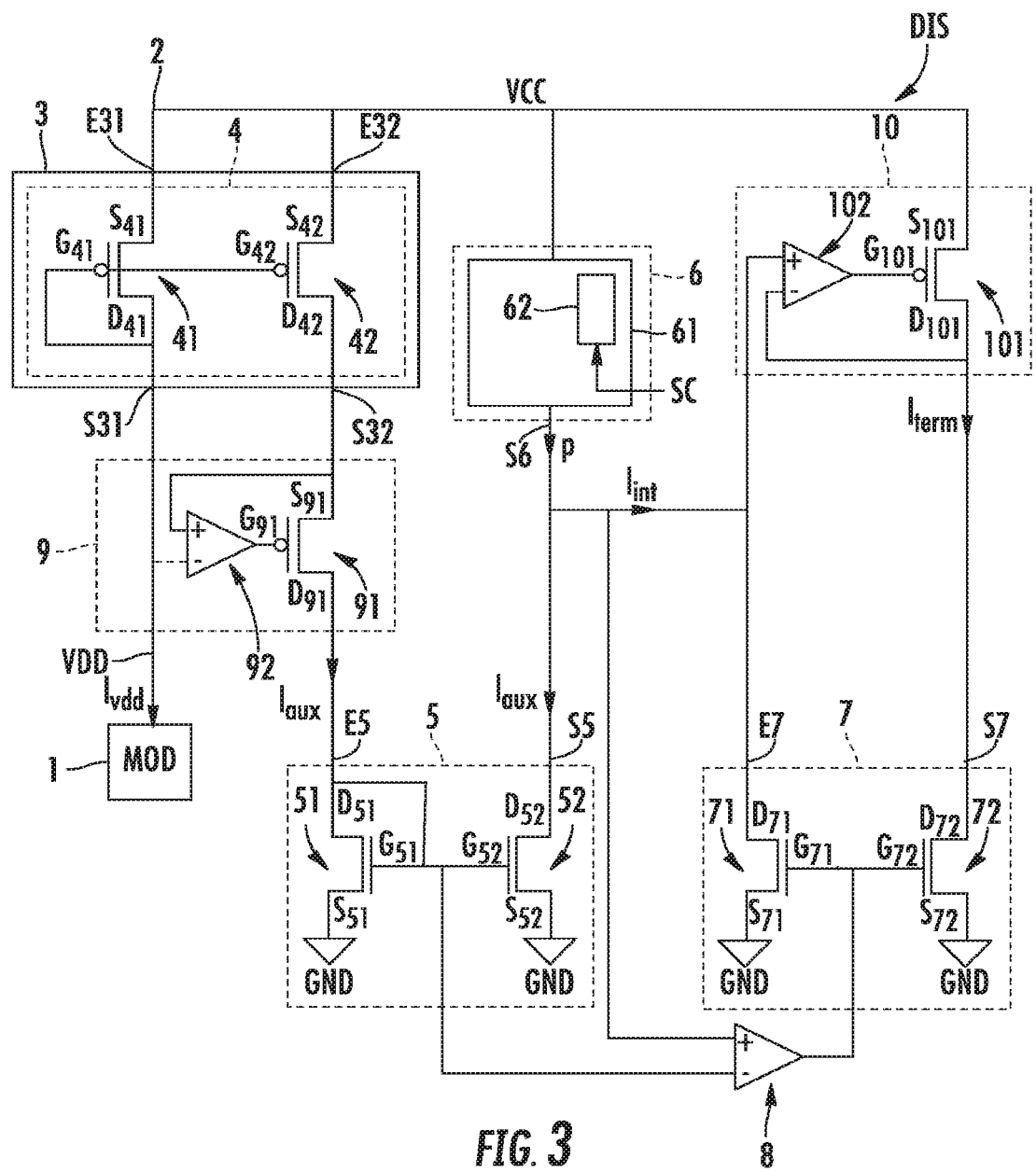

According to another embodiment illustrated in FIG. 3, the device DIS may also comprise a first cascode stage 9 coupled to the second output S32 of the first generation circuitry 4, and a second cascode stage 10 coupled to the output S7 of the terminal stage.

The first cascode stage 9 comprises a third PMOS transistor 91 having a source $S_{91}$ connected to the second output S32 of the first generation circuitr, and a drain $D_{91}$ coupled to the input E5 of the second generation circuitry 5. The cascode stage 9 further comprises a second operational amplifier 92 having a non-inverting input coupled to the first output S31 of the first generation circuitry 4, and a non-inverting input coupled to the second output S32 of the first generation circuitry 4. The output of the second operational amplifier 92 is coupled to the gate $G_{91}$ of the third PMOS transistor 91.

Thus, the first cascode stage 9 allows the voltages at the first and second outputs S31 and S32 of the first generation circuitry to be equalized, which contributes to obtaining the desired ratio of 1/100 between the current $I_{vdd}$ and the auxiliary current $$I_{aux} = \frac{Ivdd}{100}.$$

The second cascode stage 10 comprises a fourth PMOS transistor 101 having a source $S_{101}$ connected to the first power supply terminal 2, and a drain $D_{101}$ connected to the output S7 of the terminal stage.

The second cascode stage 10 further comprises a third operational amplifier 102 having a non-inverting input connected to the output S7 of the terminal stage, and an inverting input connected to the input E7 of the terminal stage. The output of the amplifier is connected to the gate $G_{101}$ of the fourth PMOS transistor 101.

Thus, the second cascode stage 10 allows the voltages at the input E7 and at the output S7 of the terminal stage to be equalized. This contributes to obtaining the desired ratio of 101 between the intermediate current $I_{int}$ and the terminal current $I_{term}$.

The two cascode stages 9 and 10 therefore allow the precisions of the current copying operations respectively carried out by the first generation circuitry 4 and of the terminal stage 7 to be improved.

Figure 4:
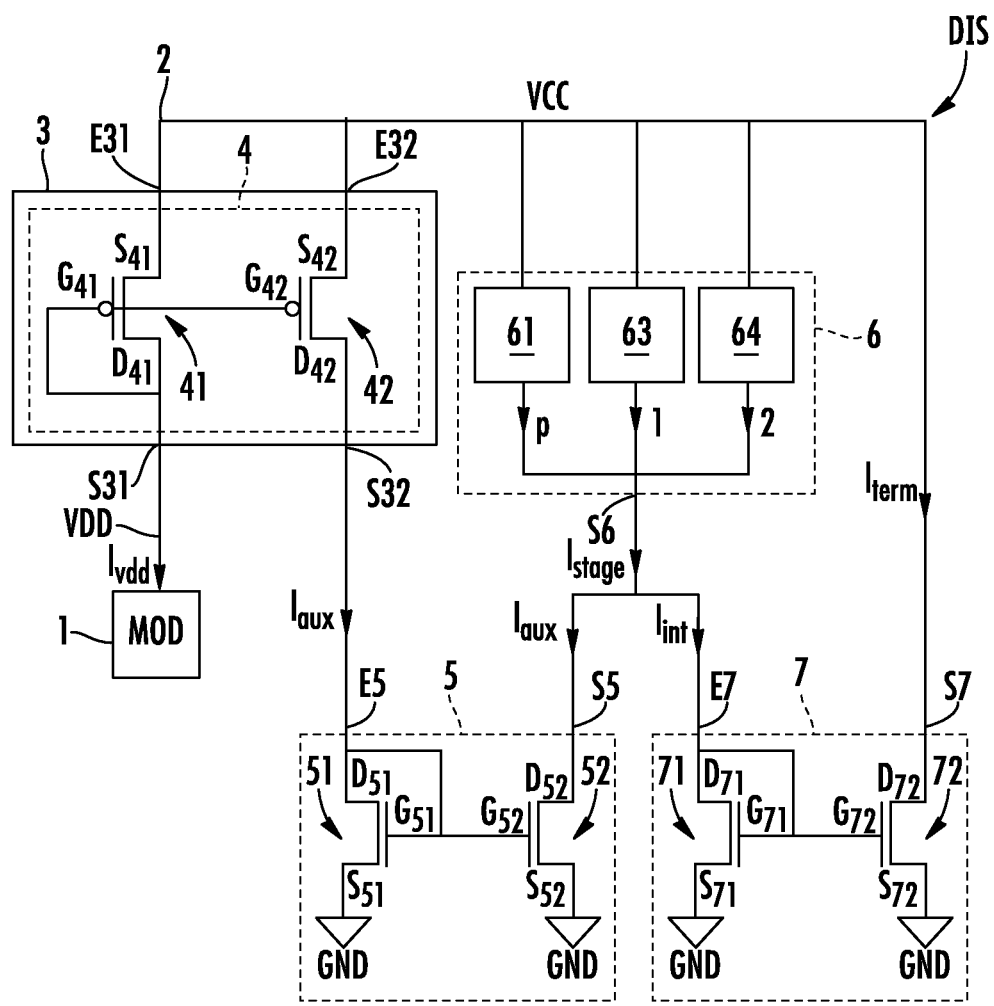

FIG. 4 illustrates one embodiment in which the first stage 6 has been modified with respect to the device DIS previously described and illustrated by FIG. 1. In this embodiment, the first stage comprises, in addition to the main current source 61 delivering the second fraction of the reference current $I_{set}$, a first additional current source 63 delivering a first additional current $I_1$ and a second additional current source 64 delivering a second additional current $I_2$.

The three current sources, 61, 63, and 64 are configured in parallel between the power supply terminal 2 and the output S6 of the first stage 6. The first and the second additional sources 63 and 64 are furthermore activatable independently of the main current source 61.

The stage current $I_{stage}$ delivered by the first stage 6 is therefore a current equal to the sum of the main current $I_p$, of the first additional current $I_1$ and of the second additional current $I_2$ when the two sources of additional currents 63 and 64 are activated. The total current $I_{vcc}$ consumed by the power supply is then $I_{vcc}=1,02*Iset+102*I_1+102*I_2$.

Since the first and second additional current sources 63 and 64 may be independently activated, the current $I_{vcc}$ consumed by the power supply may successively take various values from among the following set of values:

$I_{vcc}=1.02*Iset+102*I_1+102*I_2,$ $I_{vcc}=1.02*Iset+102*I_1,$ $I_{vcc}=1.02*Iset+102*I_2,$ $I_{vcc}=1.02*Iset.$ Thus, the detection of the variations of the module current $I_{vdd}$ are even more difficult to detect by attacks based on analysis of power consumption (SPA). This modification of the first stage is compatible with the embodiments illustrated in FIGS. 2 and 3. It is presented here using the embodiment illustrated in FIG. 1 for purposes of simplification.

Figure 5:
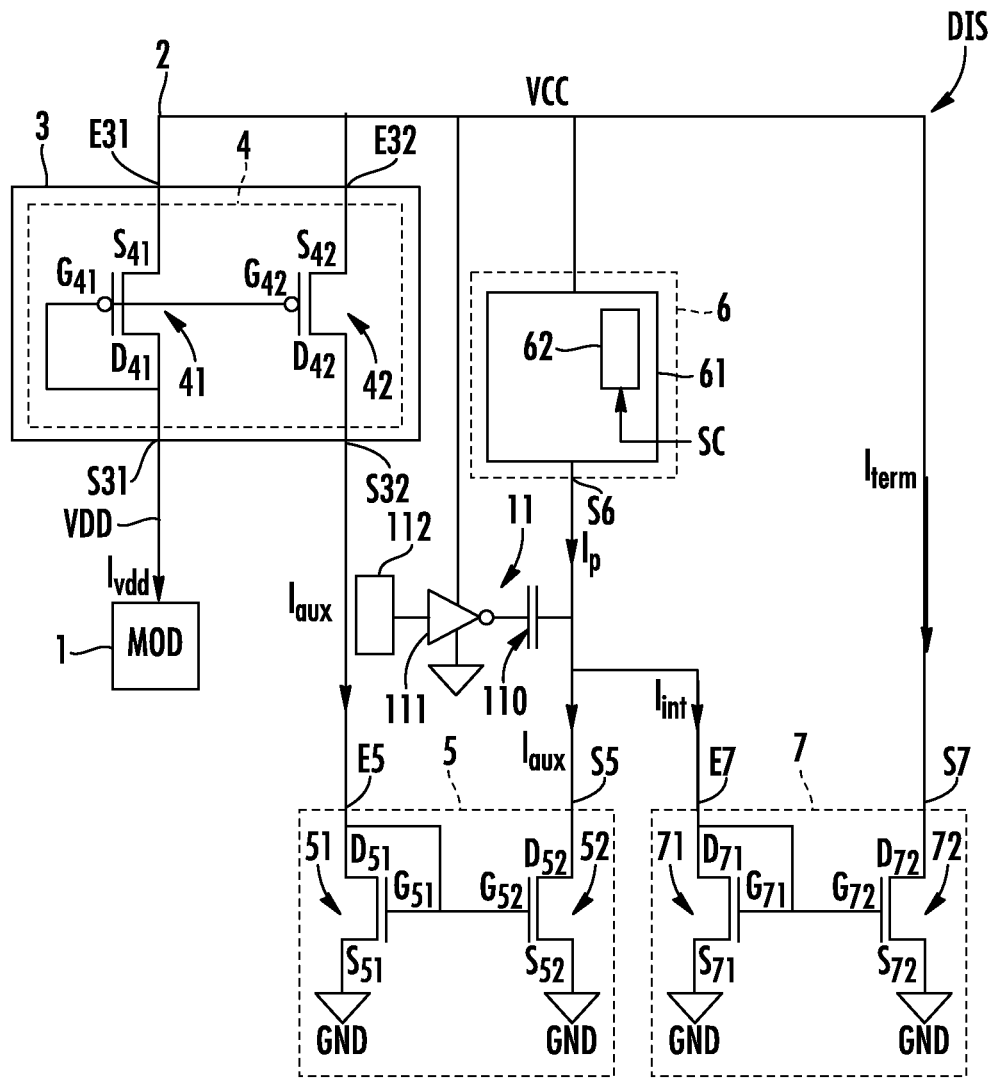

According to one variation illustrated in FIG. 5, it is also possible to add a generator of capacitive noise at the output S6 of the first stage. For example, the generator of capacitive noise 11 comprises a capacitor 110, an inverter 111 and control means or controller 112.

The first capacitor is connected via a first terminal to the output S6 of the first stage and via a second terminal to the inverter 111. The inverter 111 is powered between the power supply terminal 2 and ground GNU. The controller 112 is connected to the inverter 111 so as to, depending on the output of the inverter, charge or discharge the capacitor 110. This embodiment is also compatible with the embodiments in FIGS. 1-4.

Figure 6:
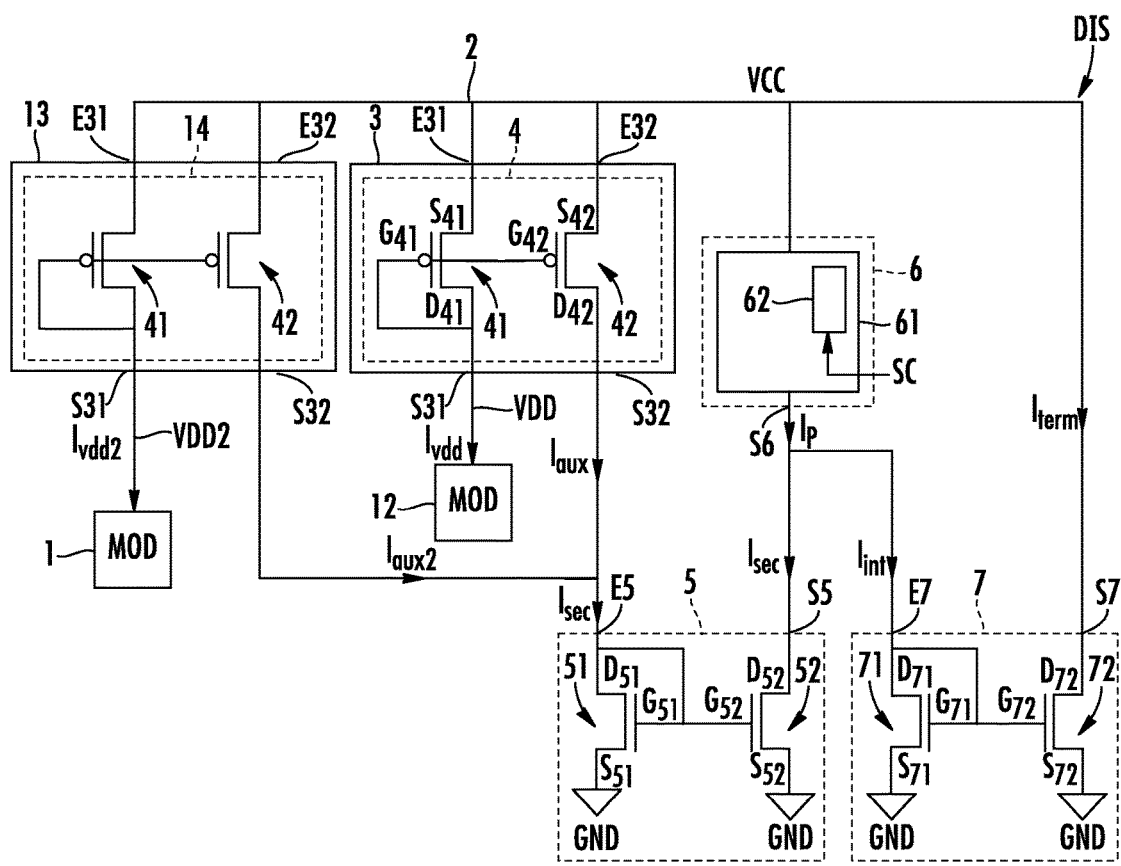

According to one variation, the device can comprise several modules. For example, in the embodiment illustrated by FIG. 6, the device DIS comprises a second module 12, for example a second microprocessor, which consumes a second module current $I_{vdd2}$, and a second regulator 13 coupled between the power supply terminal 2 and the second module, also comprising the first generation circuitry 14.

The first generation circuitry 14 therefore delivers a second module auxiliary current $I_{aux2}$ equal to the first fraction of the second module current $I_{vdd2}$ at the input E5 of the second generation circuitry 5. In this example, $$I_{aux2} = \frac{I_{vdd2}}{100}.$$

Thus, the second generation circuitry 5 receives a secondary current $I_{sec}$ on their input E5 equal to the sum of the auxiliary currents of module $I_{aux}$ and $I_{aux2}$. The main current $I_p$ is, in this example, slightly higher than the maximum value of the secondary current $I_{sec}$.

This embodiment is compatible with all of the embodiments described previously and illustrated by FIGS. 1-5. Although embodiments have been described in which the current regulators 3 and 13 comprise the first generation circuitry 4 and 14, an embodiment in which the regulators 3 and 13 are separate from the first generation circuitry 4 and 14 may be implemented.

Furthermore, the regulators are not indispensible. Indeed, each module could be powered by the power supply voltage $V_{cc}$ via a current mirror. Furthermore, although an efficient injection of capacitive noise at the output S6 of the first stage 6 has been described, capacitive noise could also be injected at other nodes, for example, at the input E5 of the second generation circuitry 5 or at the output of the operational amplifier 8.

That which is claimed is:

1. A method for smoothing current consumed by a power supply for an electronic circuit, the electronic circuit comprising at least one module powered by the power supply and consuming a module current, a first current source stage powered by the power supply and comprising at least one main current source, and a terminal stage powered coupled to the first current source stage and powered by the power supply, the method comprising:
    generating at least one module auxiliary current equal to a first fraction of current consumed by the at least one module;
    generating by the at least one main current source in the first current source stage a main current higher than a maximum value of the at least one module auxiliary current, with the first current source stage delivering a stage current at least equal to the main current;
    generating an intermediate current equal to a difference between the stage current and a secondary current equal to the at least one module auxiliary current; and
    multiplying the intermediate current in the terminal stage by a multiplication factor equal to an inverse of the first fraction incremented by one.

2. The method according to claim 1, wherein the at least one module comprises a plurality of modules; wherein the at least one module auxiliary current comprises a plurality of module auxiliary currents, with each module auxiliary current corresponding to a respective module and being equal to the first fraction of the current consumed by the respective module; wherein the main current is generated higher than a sum of maximum values of each module auxiliary current; and wherein the secondary current is equal to the sum of each module auxiliary current.

3. The method according to claim 1, wherein the main current is equal to a second fraction of a reference current, and the first fraction is equal to the second fraction.

4. The method according to claim 3, wherein the main current source comprises a control input to receive a control signal to allow a value of the second fraction to be selected from among a set of values.

5. The method according to claim 1, wherein the first current source stage further comprises at least one additional activatable current source generating at least one additional current, with the stage current being equal to a sum of the main current and the at least one additional current delivered by the at least one additional activated current source.

6. The method according to claim 1, further comprising adding capacitive noise to the output of the first current source stage.

7. An electronic device comprising:
    at least one module coupled to a power supply terminal and configured to consume a module current;
    at least one first generation circuit coupled to the power supply terminal and configured to generate at least one module auxiliary current equal to a first fraction of current consumed by the at least one module;
    a first current source stage coupled to the power supply terminal and comprising at least one main current source configured to supply a main current higher than a maximum values of the at least one module auxiliary current, said first current source stage configured to deliver a stage current at least equal to the main current;
    a second generation circuit configured to generate an intermediate current equal to a difference between the stage current and a secondary current equal to the at least one module auxiliary current; and
    a terminal stage coupled to the power supply terminal and configured to multiply the intermediate current by a multiplication factor equal to an inverse of the first fraction incremented by one.

8. The electronic device according to claim 7, wherein said at least one module comprises a plurality of modules; wherein said at least one first generation circuit comprises a plurality of first generation circuits, with each first generating circuit generating a module auxiliary current for each respective module, with each module auxiliary current being equal to the first fraction of the current consumed by the respective module; wherein said first current source stage generates the main current higher than a sum of maximum values of each module auxiliary current; and wherein said second generation circuit generates the secondary current equal to the sum of each module auxiliary current.

9. The electronic device according to claim 7, wherein the main current is equal to a second fraction of a reference current, and the first fraction is equal to the second fraction.

10. The electronic device according to claim 9, wherein the main current source comprises a control input to receive a control signal to allow a value of the second fraction to be selected from among a set of values.

11. The electronic device according to claim 7, wherein said at least one first generation circuit comprises a first copy factor current mirror equal to the first fraction and having a first output delivering the corresponding module current and a second output delivering the corresponding module auxiliary current; and wherein said second generation circuit comprises a second copy factor current mirror equal to one, and the second output of said first current mirror is coupled to an input of said second current mirror and an output of said second current mirror is coupled to the output of said first current source stage.

12. The electronic device according to claim 7, wherein said terminal stage comprises a current copying circuit having a copy factor equal to a multiplication factor, said terminal stage having an input coupled to the output of said second generation circuit and an output coupled to the power supply terminal.

13. The electronic device according to claim 12, wherein said terminal stage comprises a first MOS transistor coupled to the output of said second current mirror, and at least a second MOS transistor coupled between the power supply terminal and ground, said first MOS transistor and said at least a second MOS transistor each comprising gates, with said gates being coupled together, and the electronic device further comprising:
an intermediate operational amplifier having a non-inverting input coupled to the output of the second current mirror, an inverting input coupled to the input of said second current mirror, and an output coupled to the gates of said first MOS transistor and said at least a second MOS transistor.

14. The electronic device according to claim 11, wherein said at least one first generation circuit comprises a first cascode stage coupled between the second output of said corresponding first current mirror and the input of the second current mirror, said first cascode stage comprising a first PMOS transistor and a first operational amplifier having a non-inverting input coupled between the power supply terminal and the corresponding module, an inverting input coupled to a source of said first PMOS transistor, and an output coupled to the gate of said first PMOS transistor, and the electronic device further comprising:
a second cascode stage coupled between the output of said terminal stage and the power supply terminal, and comprising a second PMOS transistor and a second operational amplifier having a non-inverting input coupled between the output of said terminal stage and said second PMOS transistor, an inverting input coupled to the input of said terminal stage, and an output coupled to the gate of said second PMOS transistor.

15. The electronic device according to claim 7, wherein said first current source stage comprises at least one additional current source activatable independently of said main current source, with outputs of said main current source and said at least one additional current source being coupled to the output of said first current source stage.

16. The electronic device according to claim 7, further comprising a capacitive noise generator coupled to the output of said first current source stage.

17. The electronic device according to claim 7, further comprising at least one regulator coupled between the power supply terminal and said at least one module, and configured to deliver a regulated voltage to said at least one module.

18. The electronic device according to claim 17, wherein said at least one regulator comprises said at least one first generation circuit.

19. The electronic device according to claim 7, wherein said at least one module comprises a plurality of modules, and wherein said at least one first generation circuit comprises a plurality of first generation circuits comprising a plurality of first outputs respectively coupled to said plurality of modules to deliver the respective module currents, and a plurality of second outputs coupled together to the input of said second generation circuit to deliver the secondary current.

20. The electronic device according to claim 7, wherein said at least one module, said first generation circuit, said first current source stage, and said terminal stage are configured as an integrated circuit.

21. An electronic device comprising:
a plurality of modules coupled to a power supply terminal and each module configured to consume a module current;
a plurality of first generation circuits coupled to the power supply terminal, with each first generation circuit configured to generate, for each module, a module auxiliary current equal to a first fraction of current consumed by each respective module;
a first current source stage coupled to the power supply terminal and comprising at least one main current source configured to supply a main current higher than a sum of maximum values of each module auxiliary current, said first current source stage configured to deliver a stage current at least equal to the main current;
a second generation circuit configured to generate an intermediate current equal to a difference between the stage current and a secondary current equal to the sum of each module auxiliary current; and
a terminal stage coupled to the power supply terminal and configured to multiply the intermediate current by a multiplication factor equal to an inverse of the first fraction incremented by one.

22. The electronic device according to claim 21, wherein the main current is equal to a second fraction of a reference current, and the first fraction is equal to the second fraction, and wherein the main current source comprises a control input to receive a control signal to allow a value of the second fraction to be selected from among a set of values.

23. The electronic device according to claim 21, wherein each first generation circuit comprises a first copy factor current mirror equal to the first fraction and having a first output delivering the corresponding module current and a second output delivering the corresponding module auxiliary current; and wherein said second generation circuit comprises a second copy factor current mirror equal to one, and the second output of said first current mirror is coupled to an input of said second current mirror and an output of said second current mirror is coupled to the output of said first current source stage.

24. The electronic device according to claim 21, wherein said terminal stage comprises a current copying circuit having a copy factor equal to a multiplication factor, said terminal stage having an input coupled to the output of said second generation circuit and an output coupled to the power supply terminal.

25. The electronic device according to claim 23, wherein each first generation circuit comprises a first cascode stage coupled between the second output of said corresponding first current mirror and the input of the second current mirror, said first cascode stage comprising a first PMOS transistor and a first operational amplifier having a non-inverting input coupled between the power supply terminal and the corresponding module, an inverting input coupled to a source of said first PMOS transistor, and an output coupled to the gate of said first PMOS transistor, and the electronic device further comprising:
a second cascode stage coupled between the output of said terminal stage and the power supply terminal, and comprising a second PMOS transistor and a second operational amplifier having a non-inverting input coupled between the output of said terminal stage and said second PMOS transistor, an inverting input coupled to the input of said terminal stage, and an output coupled to the gate of said second PMOS transistor.

26. The electronic device according to claim 21, wherein said first current source stage comprises at least one additional current source activatable independently of said main current source, with outputs of said main current source and said at least one additional current source being coupled to the output of said first current source stage.

* * * * *